United States Patent
Schmerling

[15] 3,678,087
[45] July 18, 1972

[54] METAL SALTS OF HALO-SUBSTITUTED POLYHYDROPOLY-CYCLICDICARBOXYLIC ACIDS

[72] Inventor: Louis Schmerling, Riverside, Ill.

[73] Assignee: Universal Oil Products Company, Des Plaines, Ill.

[22] Filed: Aug. 22, 1969

[21] Appl. No.: 852,462

[52] U.S. Cl. ............260/435 R, 260/429 R, 260/429.7, 260/429.9, 260/431, 260/438.1, 260/438.5 R, 260/439 R, 260/440, 260/446, 260/447, 260/514 B, 424/287, 424/288, 424/289
[51] Int. Cl. .............C07f 3/10, C07f 1/08, C07f 15/02
[58] Field of Search......................200/514 B, 468 B

[56] References Cited

UNITED STATES PATENTS 3,499,905   3/1970   Koch et al..........................260/294.3

*Primary Examiner*—Lorraine A. Weinberger
*Assistant Examiner*—Robert Gerstl
*Attorney*—James R. Hoatson, Jr. and Raymond H. Nelson

[57] ABSTRACT

Novel compounds of matter comprising metal salts of halo-substituted polyhydromethanonaphthalene acids as exemplified by the mercury salt of 5,6,7,8,9,9-hexachloro-1, 2, 3, 4, 4a, 5, 8, 8a-octahydro-5, 8-methano-2, 3-naphthalenedicarboxylic acid are useful as fungicidal or other biocidal agents.

8 Claims, No Drawings

METAL SALTS OF HALO-SUBSTITUTED POLYHYDROPOLY-CYCLICDICARBOXYLIC ACIDS

This invention relates to novel compounds comprising certain metal salts of halo-substituted polyhydromethano- or ethanonaphthalenedicarboxylic acids; for purposes of this application, the term methano will include methano and ethano compounds. More specifically, the invention relates to these compounds and to the use thereof as fungicides.

It has now been discovered that certain pestiologically active compounds have lost some of the activity thereof due to the fact that certain insects, bacteria, fungi, etc., have become resistant to these compounds which heretofore have been used. Therefore, it is necessary to find new compounds which will possess the desirable characteristics and which will be effective in combating pests, either of animal or vegetable origin. For purposes of this invention, the term "pestiologically active" as used in the present specification will refer to compounds which possess fungicidal, bacteriacidal, insecticidal, etc., properties. With respect to the above statement concerning the resistance of certain insects, bacteria, fungi, etc., to previously used compounds, an example of this is the fact that it has been found that flies are developing a resistance to DDT.

Accordingly, it is therefore an object of this invention to provide novel compounds which possess desirable pestiological activity.

A further object of this invention is to provide fungicidal compositions of matter which comprise certain metal salts of halo-substituted polyhydromethanonaphthalenedicarboxylic acids and carriers therefor.

In one aspect, an embodiment of this invention resides in a metal salt of a dicarboxylic acid having the formula:

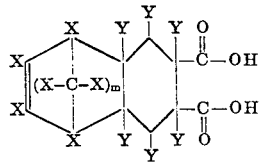

in which X is selected from the group consisting of hydrogen and halogen, particularly chlorine and/or bromine, at least two of the X's being halogen, Y is selected from the group consisting of hydrogen, halogen, and lower alkyl groups, and m is an integer of from one to two, said metal having an atomic number of from 20 to 83.

Another embodiment of this invention is found in a fungicidal composition of matter containing as an active ingredient thereof a toxic amount of a metal salt of a dicarboxylic acid having the formula:

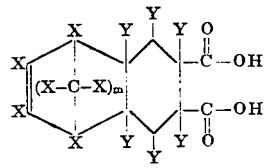

in which X is selected from the group consisting of hydrogen and halogen, particularly chlorine and/or bromine, at least two of the X's being halogen, Y is selected from the group consisting of hydrogen, halogen, and lower alkyl groups, and m is an integer of from one to two, said metal having an atomic number of from 20 to 83.

A specific embodiment of this invention resides in the mercury salt of 5,6,7,8,9,9-hexachloro-1,2,3,4,4a,5,8,8a-octahydro-5,8-methano-2,3-naphthalenedicarboxylic acid.

Other objects and embodiments will be found in the following further detailed description of this invention.

As hereinbefore set forth, the present invention is concerned with novel compounds comprising certain metal salts of halo-substituted polyhydromethanonaphthalenedicarboxyl ic acids. The metals as salts, specific examples of which will be hereinafter set forth in greater detail, are reacted with these acids utilizing certain alkali metal salts thereof as intermediates, specific details of the reaction also being hereinafter set forth in greater detail.

Any suitable halo-substituted polyhydromethanonaphthalenedicarboxylic acid or anhydride thereof may be used in the preparation of the desired compound, said halo-substituted polyhydromethanonaphthalenedicarboxylic acid or anhydride being illustrated by the following general formulas:

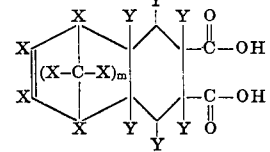

and

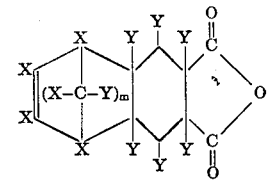

in which X is selected from the group consisting of halogen, particularly chlorine and/or bromine, and hydrogen radicals, at least two of the X's being halogen, Y is selected from the group consisting of hydrogen, halogen and lower alkyl groups, and m is an integer of from one to two. Representative examples of the polyhalopolyhydromethanonaphthalenedicarboxylic acids or anhydrides thereof which may be utilized include 5,6,7,8,9,9-hexachloro-1,2,3,4,4a,5,8,8a-octahydro-5,8-methano-2,3-naphthalenedicarboxylic acid which is prepared by condensing a conjugated aliphatic diene such as 1,3-butadiene with maleic acid and thereafter further condensing the resultant cyclohexenedicarboxylic acid, which is 1,2,3,6-tetrahydrophthalic acid, with a halocycloalkadiene such as hexachlorocyclopentadiene to form the desired product. It is to be understood that the corresponding anhydride may be prepared by utilizing maleic anhydride as one of the starting materials in place of maleic acid. It is to be understood that other starting materials may also be utilized to form similar acids or anhydrides. Illustrative examples of these starting materials include other acids such as fumaric acid, itaconic acid, citraconic acid, glutaconic acid, etc.; other conjugated aliphatic dienes include 2-methyl-1,3-butadiene, 1,3-pentadiene, 1,3-hexadiene, 2,4-hexadiene, 2,3-dimethyl-1,3-butadiene, 1,3-heptadiene, 2,4-heptadiene; conjugated octadienes, nonadienes, etc.; other suitable halo-substituted cycloalkadienes which may be used include 1,2-dichlorocyclopentadiene, 1,2,3-trichlorocyclopentadiene, 1,2,3,4-tetrachlorocyclopentadiene, 1,2,3,4,5-pentachlorocyclopenta-diene and similar compounds in which all or part of the chlorine is replaced by other halogen atoms and particularly bromine.

The aforementioned halo-substituted polyhydromethanonaphthalenedicarboxylic acids or anhydrides thereof are reacted with an alkali metal hydroxide such as lithium hydroxide, sodium hydroxide, potassium hydroxide, rubidium hydroxide, or cesium hydroxide. Of the aforementioned alkali metal hydroxides, the preferred compounds comprise sodium hydroxide or potassium hydroxide due to their relatively greater availability and increasingly lower cost.

The reaction is effected by preparing an aqueous solution of the alkali metal hydroxide which contains from about 10 to about 20 percent alkali metal hydroxide; alcohol or other substantially inert solvent may be added. The halo-substituted polyhydromethanonaphthalenedicarboxylic acid or anhydride and the alkali metal hydroxide are reacted at temperatures from ambient (about 25° C.) up to about 50° C. or more and at atmospheric pressures. Generally speaking, the alkali metal hydroxide may be present in somewhat less than a molar equivalent to the dicarboxylic acid (i.e., less than 2 moles per mole acid) and the resulting solution of the disodium salt is filtered from excess acid. Alternatively, the alkali metal hydroxide is present in more than equivalent amount to the acid or anhydride (i.e., in the range of about 2.5 to about 5 moles of alkali per mole of acid or anhydride). In this case, the excess alkali metal hydroxide remaining after the dicarboxylic acid is converted to the alkali metal salt is carefully neutralized.

The alkali metal salt of the halo-substituted polyhydromethanonaphthalenedicarboxylic acid (in aqueous solution) is then reacted with a salt of a heavy metal in aqueous solution to prepare the desired compound which precipitates from the solution. The metals which are used to prepare the desired compound will possess an atomic number of from 20 to 83, the preferred metals in this group being chromium, manganese, iron, cobalt, nickel, copper, zinc, arsenic, molybdenum, cadmium, tin, antimony, tungsten, mercury, lead, bismuth, etc. It is also contemplated within the scope of this invention that other metals which possess an atomic number between 20 and 83 may also be utilized to form the desired products, although not necessarily with the equivalent results. The desired products are prepared by reacting the alkali metal salt of the halo-substituted polyhydromethanonaphthalenedicarboxylic acid in aqueous solution with a water-soluble salt of the heavy metal. Water-soluble salts which may be used will include mercury acetate, mercury nitrate, mercury chloride, mercury bromide, arsenic acetate, arsenic nitrate, arsenic chloride, arsenic bromide, zinc acetate, zinc nitrate, zinc chloride, zinc bromide, bismuth acetate, bismuth nitrate, bismuth chloride, bismuth bromide, copper acetate, copper nitrate, copper chloride, copper bromide, antimony acetate, antimony nitrate, antimony chloride, antimony bromide, lead acetate, lead nitrate, iron acetate, iron nitrate, iron chloride, iron bromide, nickel acetate, nickel nitrate, nickel chloride, nickel bromide. It is understood that the aforementioned water-soluble salts of heavy metals falling within the definition of the instant application are only representative of the class of salts which may be used, and that the present invention is not necessarily limited thereto. The desired salts are prepared in a manner similar to that hereinbefore set forth, that is, an aqueous solution of salt of the heavy metal is reacted with the alkali metal salt of halo-substituted polyhydromethanonaphthalenedicar-boxylic acid at ambient temperatures and pressures, the alkali metal salt of the acid and the water-soluble salt of the heavy metal being present in equal stoichiometric amounts. The desired heavy metal salt of the halo-substituted polyhydromethanonaphthalenedicarboxylic acid is usually insoluble in water and will precipitate out, thereby being easily recovered by filtration of the solution.

The process of this invention may be effected in any suitable manner and may comprise a batch or continuous type operation. For example, when a batch type operation is used a quantity of the halo-substituted polyhydromethanonaphthalenedicarboxylic acid or anhydride thereof and the aqueous solution of the alkali metal hydroxide, preferably sodium hydroxide or potassium hydroxide, is placed in a condensation apparatus. The salt-formation is allowed to precede for a predetermined period of time which may range from about 0.5 up to about 10 hours or more in duration. Upon completion of the desired residence time the solution of the alkali metal salt of the halo-substituted polyhydromethanonaphthalenedicarboxylic acid is then separated from the unreacted starting materials by conventional means as described above. The thus separated alkali metal salt solution is then placed in a second condensation apparatus along with a stoichiometric amount of an aqueous solution of a salt of a heavy metal of the type hereinbefore set forth. The reaction is also allowed to proceed for a predetermined residence time which may be of the same duration as that required to effect the formation of the alkali metal salt, that is, from about 0.5 hours up to about 10 hours or more in duration. This reaction, as the previous one, is usually effected at ambient temperature and atmospheric pressure although it is also contemplated within the scope of this invention that elevated temperatures and super-atmospheric pressure may be employed, the amount of pressure being used being that which is sufficient to maintain a major portion of the water in the liquid phase. Upon completion of the reaction the desired heavy metal salt of the halo-substituted polyhydromethanonaphthalenedicarboxylic acid which is usually insoluble in the aqueous solution is recovered from the aqueous solution of the salt of the heavy metal and the alkali metal salt of the acid, if any remains, by conventional means such as filtration. After purification of the heavy metal salt, the product is recovered and removed to storage.

It is also contemplated within the scope of this invention that the preparation of the metal salt of halo-substituted polyhydromethanonaphthalenedicarboxylic acid may be effected in a continuous manner of operation. When this type of operation is employed the starting materials comprising the aqueous solution of the alkali metal hydroxide and the halo-substituted polyhydromethanonaphthalenedicarboxylic acid or anhydride thereof are continuously charged to a reaction zone which is maintained at the proper operating conditions of temperature and pressure which, in the instant reaction, preferably comprises ambient temperature, and atmospheric pressure. After a predetermined residence time has elapsed which is accompanied by complete admixture of the reactants, the reactor effluent is continuously withdrawn and the alkali metal salt of the halo-substituted polyhydromethanonaphthalenedicarboxylic acid is separated from any unreacted dicarboxylic acid by conventional means, the latter being recycled to the reaction zone to form a portion of the feed stock, and any unreacted alkali metal hydroxide is neutralized. The solution of the alkali metal salt of the halo-substituted polyhydromethanonaphthalenedicarboxylic acid is then charged to a second reactor while the aqueous solution of the salt of the heavy metal is also continuously charged thereto through separate means. After reaction in the second zone the effluent from the second zone is also continuously discharged and the desired heavy metal salt of the halo-substituted polyhydromethanonaphthalenedicarboxylic acid is separated from the unreacted starting materials and removed to storage, the unreacted materials being recycled to the second reaction zone to form a portion of the feed stock have set second zone.

The desired products of this invention which comprise novel compositions of matter will possess the generic formula

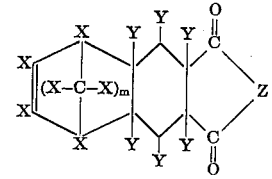

in which X is selected from the group consisting of hydrogen and halogen, particularly chlorine and/or bromine, at least two of the X's being halogen, Y is selected from the group consisting of hydrogen, halogen, and lower alkyl groups, $m$ is an integer of from one to two, and Z is a metal having an atomic number of from 20 to 83.

Some specific examples of these compounds will include the mercury salt of 5,6,7,8,9,9-hexachloro-1,2,3,4,4a,5,8,8a-octahydro-5,8-methano-2,3-naphthalenedicarboxylic acid, the arsenic salt of 5,6,7,8,9,9-hexachloro-1,2,3,4,4a,5,8,8a-octahydro-5,8-methano-2,3-naphthalenedicarboxylic acid, the antimony salt of 5,6,7,8,9,9-hexachloro-1,2,3,4,4a,5,8,8a-octahydro-5,8-methano-2,3-naphthalenedicarboxylic acid, and the copper salt of 5,6,7,8,9,9-hexachloro-1,2,3,4,4a,5,8,8a-octahydro-5,8-methano-2,3-naphthalenedicarboxylic acid, the corresponding chromium, manganese, iron, cobalt, nickel, zinc, molybdenum, cadmium, tin, tungsten, lead, and bismuth salts of these acids as well as the polybromo-substituted acids. It is to be understood that the aforementioned heavy metal salts of the halo-substituted polyhydropolycyclicdicarboxylic acids are only representative of the class of compounds which constitute novel compositions of matter, and that the present invention is not necessarily limited thereto.

As hereinbefore set forth these novel compositions of matter, due to the particular configuration of the molecule, as well as the presence of a heavy metal possesses many desirable characteristics for use as pestiologically active compounds. The compounds can be used as dusts, emulsifiable concentrates or wettable powders, the active ingredient being composited with a suitable carrier comprising an inert substance. In addition to possessing excellent fungicidal properties, especially against scab, smut, seedling blight or set decay, the compounds are exceedingly stable and will not tend to decompose, thereby losing their effectiveness as fungicidal, bacteriacidal or pesticidal agents. This ability to remain stable will be of great importance inasmuch as the reduction time on the crops etc. will be lengthened and, therefore, a relatively lesser amount of the active ingredients will be required overall, thereby lowering the cost of applying the compounds to the material to be protected.

The following examples are given to illustrate the process of the present invention which, however, are not intended to limit the generally broad scope of the present invention in strict accordance therewith.

EXAMPLE I

In this example 5,6,7,8,9,9-hexachloro-1,2,3,4,4a,5,8,8a-octahydro-5,8-methano-2,3-naphthalenedicarboxylic anhydride is prepared by condensing 1,3-butadiene with maleic anhydride at a temperature in the range of from about 80° to about 250° C. in the presence of benzene which acts as the solvent therefor. The resulting tetrahydrophthalic anhydride is further condensed with hexachlorocyclopentadiene at a similar temperature in the presence of benzene in a Diels-Alder type reaction to form the desired anhydride.

The thus prepared anhydride (53 g, 0.12 mol) was then reacted with an aqueous solution of 6.1 (0.1 mol) potassium hydroxide at a temperature of 50° C. Following this the resulting clear solution of the alkali metal salt of the dicarboxylic acid was filtered from excess acid and anhydride and a portion of the filtrate was then treated with an aqueous solution of mercury chloride in somewhat stoichiometric excess at room temperature. The desired mercury salt of 5,6,7,8,9,9-hexachloro-1,2,3,4,4a,5,8,8a-octahydro-5,8-methano-2,3-naphthalenedicar-boxylic acid (a white powder) precipitated out and was recovered from the solution by filtration. The salt was then dried and recovered.

EXAMPLE II

A second 10 ml portion of the filtrate of Example I was treated with an aqueous solution of cupric chloride. A blue, milky precipitate separated. This was filtered off, water-washed, and dried. A blue powder, cupric 5,6,7,8,9,9-hexachloro-1,2,3,4,4a,5,8,8a-octahydro-5,8-methano-2,3-naphthalenedicarboxylate was obtained. Analysis showed that it contained 11.8 percent copper; the calculated composition for the above-named compound is 12.6 percent copper. The somewhat low analytical value may indicate the presence of water of crystallization in the blue salt.

EXAMPLE III

In this example 1 mol proportion of 5,6,7,8,9,9-hexachloro-1,2,3,4,4a,5,8,8a-octahydro-5,8-methano-2,3-naphthalenedicarboxylic anhydride which has been prepared according to the process set forth in Example I above was reacted with 2 mol proportions of potassium hydroxide dissolved in aqueous ethanol, said reaction being effected at about 80° C. (steam bath temperature). A portion of the aqueous solution of the resulting salt was reacted with an aqueous solution of lead acetate in equimolar proportions at a temperature of about 25° C. and atmospheric pressure for a period of 0.5 hour. During this time the lead salt of 5,6,7,8,9,9-hexachloro-1,2,3,4,4a,5,8,8a-octahydro-5,8-methano-2,3-naphthalenedicarboxylic acid precipitated out and was recovered as a white powder by filtration from the aqueous medium.

EXAMPLE IV

In this example, ferric 5,6,7,8,9,9-hexachloro-1,2,3,4,4a,5,8,8a-octahydro-5,8-methano-2,3-naphthalenedicarboxylate was prepared by mixing a portion of the potassium salt solution of Example III with an aqueous solution of ferric chloride. The material was a tan powder.

EXAMPLE V

Cobalt and nickel salts of the 5,6,7,8,9,9-hexachloro-1,2,3,4,4a,5,8,8a-octahydro-5,8-methano-2,3-naphthalenedicarboxylic acid were prepared by treating solutions of the potassium salt of the acid (from Example III) with aqueous solutions of cobalt chloride and of nickel chloride. Filtration of the precipitated salts followed by washing and drying yielded the desired salts.

EXAMPLE VI

To illustrate the fungicidal activity of the compounds prepared according to the process of the present invention a fungicidal composition of matter is prepared by dissolving 1 gram of the mercury salt of 5,6,7,8,9,9-hexachloro-1,2,3,4,4a,5,8,8a-octahydro-5,8-methano-2,3-naphthalenedicarboxylic acid is emulsified with 500 cc. of water utilizing an emulsifying agent such as Tritone X-100 in order to effect a solution. The solution is sprayed on cereal plants such as wheat, rye, etc. and will demonstrate fungicidal activity against mildew as well as spore germination of various fungi. Other fungicidal compositions of matter utilizing the heavy metal salts which have been prepared according to Examples II to IV above when composited with a like carrier and sprayed on cereal plants will exhibit like properties.

I claim as my invention:

1. A metal salt of a dicarboxylic acid having the formula

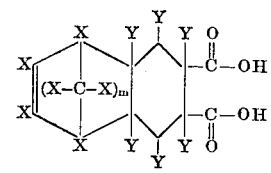

in which X is selected from the group consisting of hydrogen and halogen, at least two of the X's being halogen, Y is selected from the group consisting of hydrogen, halogen and lower alkyl groups, m is an integer of from one to two, and said metal having an atomic number of from 20 to 83.

2. The compound of claim 1 in which X is chlorine.
3. The compound of claim 1 in which X is bromine.
4. The compound as set forth in claim 1 being the mercury salt of 5,6,7,8,9,9-hexachloro-1,2,3,4,4a,5,8,8a-octa-hydro-5,8-methano-2,3-naphthalenedicarboxylic acid.
5. The compound of claim 1 being the copper salt of 5,6,7,8,9,9-hexachloro-1,2,3,4,4a,5,8a-octahydro-5,8-methano-2,3-naphthalenedicarboxylic acid.
6. The compound of claim 1 being the lead salt of 5,6,7,8,9,9-hexachloro-1,2,3,4,4a,5,8,8a-octahydro-5,8-methano-2,3-naphthalenedicarboxylic acid.
7. The compound of claim 1 being the iron salt of 5,6,7,8,9,9-hexachloro-1,2,3,4,4a,5,8,8a-octahydro-5,8-methano-2,3-naphthalenedicarboxylic acid.
8. The compound of claim 1 being the nickel salt of 5,6,7,8,9,9-hexachloro-1,2,3,4,4a,5,8a-octahydro-5,8-methano-naphthalenedicarboxylic acid.

* * * * *